(12) United States Patent
Weiss

(10) Patent No.: US 6,418,180 B1
(45) Date of Patent: Jul. 9, 2002

(54) METHOD AND APPARATUS FOR COUNTING OBJECTS HAVING SUBSTANTIALLY UNIFORM SIZE

(76) Inventor: Marvin Weiss, 51 Turtle Bay Dr., Branford, CT (US) 06405

( * ) Notice: Subject to any disclaimer, the term of this patent is extended or adjusted under 35 U.S.C. 154(b) by 0 days.

(21) Appl. No.: 09/910,498

(22) Filed: Jul. 19, 2001

(51) Int. Cl.$^7$ ............................................... G06M 11/00
(52) U.S. Cl. .................. 377/6; 377/7; 377/10
(58) Field of Search .................. 377/6, 7, 10

(56) References Cited

U.S. PATENT DOCUMENTS

| | | | |
|---|---|---|---|
| 5,117,467 A | * 5/1992 | Misaki et al. ................... 382/6 |
| 5,671,290 A | 9/1997 | Vaidyanathan | |
| 5,828,716 A | * 10/1998 | Bisconte de Saint Julien ............. 377/10 |

\* cited by examiner

*Primary Examiner*—Margaret R. Wambach
(74) *Attorney, Agent, or Firm*—Bachman & Lapointe, P.C.

(57) ABSTRACT

A method for counting substantially uniformly sized objects includes the steps of obtaining an image of substantially uniformly sized objects; analyzing the image to determine total object area in the image and average object size of the objects; and determining a count of the objects from the total object area and the average object size.

10 Claims, 1 Drawing Sheet

METHOD AND APPARATUS FOR COUNTING OBJECTS HAVING SUBSTANTIALLY UNIFORM SIZE

BACKGROUND OF THE INVENTION

The invention relates to a method and apparatus for counting objects having substantially uniform size, for example seeds, grain and the like.

The need exists for accurate and fast methods for counting objects, for example for counting seeds, grain and the like. In this field, it is also important to be able to determine average object weight measurements as well, such as the thousand kernel weight (TKW), and size distribution from a sample of grain kernels. The thousand kernel weight is indicative of the average mass of grain kernels, and enables breeders to select large-grained cultivars, and also permits growers to calculate the sowing rates needed to achieve optimum plant densities. The thousand kernel weight is also valuable to maltsters and millers, who prefer plump grains, since plump grains malt and/or mill more evenly and have a higher proportion of endosperm than small grains.

Conventional methods for accomplishing this include electro-mechanical counters and complex digital imaging systems that require the grain to be presented as separate grains. These systems and methods do not present sufficient accuracy and speed of obtaining the count, and further can include complex programming and machinery which leads to additional expense, as well as carefully prepared samples for counting.

It is clear that the need remains for an improved method and apparatus for obtaining the desired count of substantially uniform-sized objects.

It is therefore the primary object to provide such a method and apparatus.

Other objects and advantages of the present invention will appear hereinbelow.

SUMMARY OF THE INVENTION

In accordance with the present invention, the foregoing objects and advantages have been readily attained.

According to the invention, a method is provided for counting substantially uniformly sized objects, which method comprises the steps of obtaining an image of substantially uniformly sized objects; analyzing said image to determine total object area in said image and average object size of said objects; and determining a count of said objects from said total object area and said average object size.

In further accordance with the present invention, an apparatus has been provided for counting substantially uniformly sized objects, which apparatus comprises means for obtaining an image of substantially uniformly sized objects; and processor means associated with said means for obtaining said image and adapted to (a) obtain an image of substantially uniformly sized objects; (b) analyze said image to determine total object area in said image and average object size of said objects; and (c) determine a count of said objects from said total object area and said average object size.

BRIEF DESCRIPTION OF THE DRAWINGS

A detailed description of preferred embodiments of the present invention follows, with reference to the attached drawings, wherein.

DETAILED DESCRIPTION

The invention relates to a method and apparatus for counting substantially uniformly sized objects such as seeds, grain and the like.

In accordance with the present invention, a count of such objects, as well as a determination of average object size and, if desired, average object weight, are determined by first obtaining a scanned image of a sample of such objects, and then analyzing the scanned image utilizing steps determined in accordance with the present invention to provide an extremely accurate count of objects, as well as an extremely accurate estimation of average object size. As set forth above, this is particularly desirable in that accurate and fast methods for counting objects are desirable, as are methods for determining particular characteristics of objects such as grain, for example in connection with malting, milling, and the like.

In accordance with the present invention, the scanned image is input to a processor system, for example a typical PC, laptop or the like, wherein the image is analyzed utilizing known image processing routines to determine the total object area of objects in the scanned image. The average size of single objects defined in the image is also determined, and total object count can then be determined with excellent accuracy.

Figure 1:
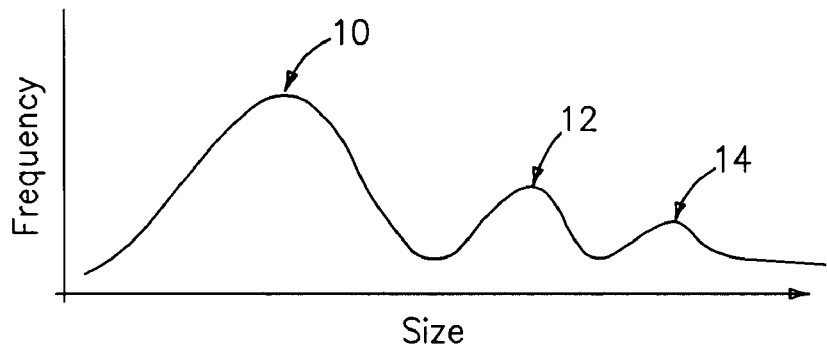
FIG. 1 schematically illustrates a typical histogram for a scanned image in accordance with the present invention.

The method and apparatus in accordance with the present invention are particularly well suited for counting substantially uniformly-sized objects, in that the method and apparatus of the present invention rely on the most frequently encountered, or smallest commonly grouped, object size as the average object size present. In this regard, FIG. 1 illustrates a typical histogram of object size versus object frequency. With objects having substantially uniform size, some of which may be adjacent to each other in clumps of two, three or more, it has been found that the histogram will have an appearance as in FIG. 1, with the first and/or highest peak and largest frequency 10 indicating the average object size, and with a series of smaller peaks extending upwardly in size in multiples of the original average size, illustrating clumps of two objects 12, three objects 14 and the like.

By selecting the first or most frequent size as the average object size, and having already determined total object area in the scanned image, the grain count can be determined as follows: count (objects)=object area (cm2)/average object size (cm2/object).

In accordance with a preferred embodiment of the invention, the count is determined by analyzing the image to determine a count and object area of single objects in the image, as well as total object area in the image. The object area of single objects in the image is subtracted from the total object area, and the remaining object area represents objects in clumps of 2 or more. The average object size can then be determined from the count of single objects and single object area, and then the remaining count of clumped objects can be determined using the clumped object area and the average object size. Combining the single object count and clumped object count then provides a final count of objects which has been found according to the invention to be extremely accurate. This is particularly true in instances where object uniformity is such that a single large object is still smaller than two of the smallest objects clumped together. This helps to define a noticeable distribution or clumping of object sizes that can be used to identify the single objects according to the invention.

It has been found that a certain number of objects in the initial image must not be touching in order to obtain good results, and it is preferred that the objects be positioned in an arrangement for obtaining of the image wherein at least about 25% of the objects are not touching. In connection with grain, for example, this can be accomplished by putting the sample of grain in a typical tray and shaking the tray such that few or no objects overlap, and such that at least about 25% are single objects as desired.

It should be readily appreciated that appropriate software for carrying out the aforesaid steps can readily be developed, and various conventional processor units such as personal computers, laptops and the like can be programmed to carry out such steps, well within the skill of a person of ordinary skill in the art.

Figure 2:
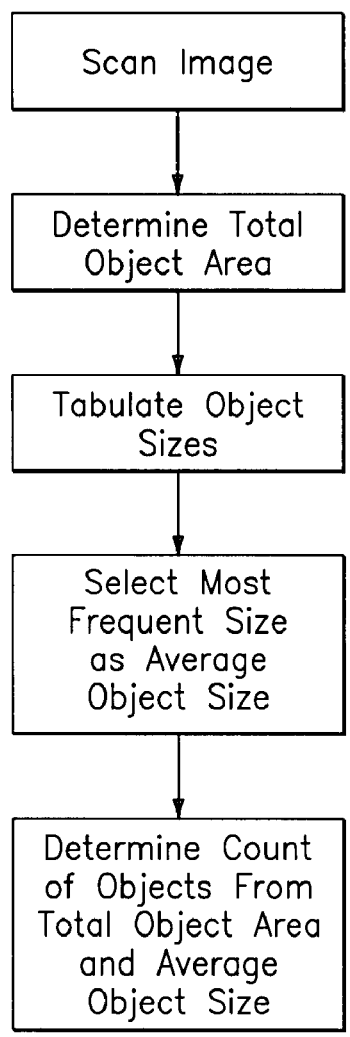
FIG. 2 schematically illustrates the method in accordance with the present invention.

Turning to FIG. 2, the broad method of the present invention is further schematically illustrated. As shown, a scanned image is obtained, for example using a seed tray and typical scanner, so as to obtain a scanned image which can then be provided to the processor programmed in accordance with the present invention to carry out the desired method steps.

Determining total object area is carried out by evaluating the shade of objects appearing in the scanned image as against a background shade so as to readily distinguish object area from background area.

Next, object sizes are obtained and tabulated, for example by associating adjacent pixels in the image to define individual objects, and any of various potential methods is used to determine the most frequent object size identified. The most frequently occurring object size, in the case of substantially uniformly-sized objects, will be the average object size. Additional high frequencies of object sizes will be encountered at multiples of the original average object size, which will indicate objects clumped together in clumps of two, three and so on. The most frequent or smallest clump of sizes occurring is selected, in accordance with the present invention, as the average object size or predicted average object size, and the count of objects is then advantageously determined from the total object area and predicted average object size.

As set forth above, average object weight data is also useful in accordance with the present invention, and this can be obtained by weighing a sample of objects before scanning of an image of the objects, such that weight information is available along with the count. This method can be used, for example, to determine the Thousand Kernel Weight, and the like.

Also, it should be appreciated that the method of the present invention can also advantageously be used to provide object size distribution information. The first clump or most frequently occurring clump of object sizes has been found in accordance with the invention to provide a very accurate indication as to distribution of the entire sample.

The method and apparatus of the present invention have been correlated with hand (seed tray) counted samples. This was carried out using barley, wheat and malted barley, and the counting method of the present invention was compared with a commercially available random sample digital imaging method customized for counting grains using image erosion separation. For the barley test, the method of the present invention was both more accurate and faster than the commercial method. Specifically, the method of the present invention provided accuracy (r) within r=0.9996, in seven seconds, while the commercial method provided accuracy (r) of r=0.9854 in fifty one seconds.

Two electro-mechanical counters were also tested, and these were much slower and less accurate than the method of the present invention, with accuracy factors of 0.9987 and 0.9934. Finally, three different methods were used for distributing the seed in the scanner from which the scanned image was obtained, and three different scanners were used to obtain the image. The accuracy results showed no significant difference as between the three scanners and methods of distribution ($p<0.01$).

In accordance with the present invention, it should be readily appreciated that a method and apparatus have been provided which clearly accomplish the objects of the present invention, and which provide fast and accurate count of substantially uniformly-sized objects such as grain, seeds and the like.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A method for counting substantially uniformly sized objects, comprising the steps of:

obtaining an image of substantially uniformly sized objects;

analyzing said image to determine total object area in said image and average object size of said objects; and determining a count of said objects from said total object area and said average object size.

2. The method of claim 1, wherein said step of obtaining an image comprises providing a sample of objects in an arrangement wherein at least 25% of said objects are single objects, and obtaining said image from said arrangement.

3. The method of claim 1, wherein said analyzing step comprises determining a most frequent object size of objects in said arrangement, and assigning that object size as said average object size.

4. The method if claim 1, wherein said analyzing step comprises plotting object size frequency in order of increasing object size, selecting a smallest in size grouping of object sizes, determining an average object size value of said smallest in size grouping, and assigning said average object size value to said average object size.

5. The method of claim 1, wherein said analyzing step comprises obtaining a count of single objects in said image, and a single object area of said single objects in said image, determining an average size of said single objects in said image, subtracting said single object area from said total object area to obtain a clumped object area, and dividing said clumped object area by said average size so as to obtain a count of clumped objects in said image.

6. The method of claim 1, wherein said objects are seeds.

7. The method of claim 1, wherein said objects are grain.

8. The method of claim 1, wherein said step of analyzing said image comprises the steps of scanning said image so as to provide machine-readable data corresponding to objects in said image, and providing said machine-readable data to a processor adapted to determine said total object area and said size distribution from said machine-readable data.

9. The method of claim 1, further comprising obtaining weight of total objects in said image, and determining an average object weight from said weight and said count.

10. An apparatus for counting substantially uniformly sized objects, comprising:

means for obtaining an image of substantially uniformly sized objects; and processor means associated with said means for obtaining said image and adapted to:

(a) obtain an image of substantially uniformly sized objects;

(b) analyze said image to determine total object area in said image and average object size of said objects; and (c) determine a count of said objects from said total object area and said average object size.

* * * * *